United States Patent [19]
Ellenberger et al.

[11] Patent Number: 5,224,675
[45] Date of Patent: Jul. 6, 1993

[54] MOUNTING APPARATUS

[75] Inventors: John C. Ellenberger, Clovis; William S. Arbuckle; William F. Kuester, III, both of Fresno, all of Calif.

[73] Assignee: Pelco, Clovis, Calif.

[21] Appl. No.: 786,723

[22] Filed: Nov. 1, 1991

[51] Int. Cl.⁵ .......................................... F16M 11/00
[52] U.S. Cl. .................................. 248/183; 248/278; 352/243; 354/293
[58] Field of Search ............... 248/183, 177, 176, 278; 354/293, 294; 352/243, 242

[56] References Cited

U.S. PATENT DOCUMENTS

| | | | |
|---|---|---|---|
| 2,516,068 | 7/1950 | Nash | 248/183 |
| 3,164,838 | 1/1965 | Heinrich | 354/293 X |
| 4,310,136 | 1/1982 | Mooney | 248/183 |
| 4,687,170 | 8/1987 | Beaver | 248/183 X |
| 4,828,376 | 5/1989 | Padera | 248/183 X |
| 4,838,117 | 6/1989 | Bittner | 248/183 X |

FOREIGN PATENT DOCUMENTS 2614438  10/1988  France ............................ 354/293

OTHER PUBLICATIONS

"Security", Cahners Publishing, front cover, Oct. 1991.
"Pan and Tilts", product information leaflet, Vicon Industries Inc., Melville, N.Y., pp. 12-15.
"Vicon Instructions for Installation and Operation", Vicon Industries Inc., Melville, N.Y., 1987.
"Weatherproof Outdoor Pan and Tilt Drives", Burle Security Products, Lancaster, Pa., 1990.
"EX9100 and EX9200 Series Motorized Cameras", Elbex America Inc., Carson, Calif.
"Variable Speed, All Weather Pan/Tilt Head", Videor Technical, Middletown, Pa., Aug. 1990.
"Portable Multipurpose Remote Control Pan-Tilt System", Canon, Englewood Cliffs, N.J., 1987.
"Model PT7100/PT7150 Series Pan/Tilt Systems", Pelco, Clovis, Calif., Oct. 1990.

Primary Examiner—David L. Talbott
Attorney, Agent, or Firm—Prince, Yeates & Geldzahler

[57] ABSTRACT

A mounting apparatus for a work object dependent for operation upon at least one subsystem, the mounting apparatus comprising an assembly adapted for attachment to said work object; a main mount adapted to be secured on a means of support; and a frame mounted on and interconnecting said assembly and said main mount having at least one outwardly facing surface mounting said subsystem of the work object for ease of access thereto.

15 Claims, 8 Drawing Sheets

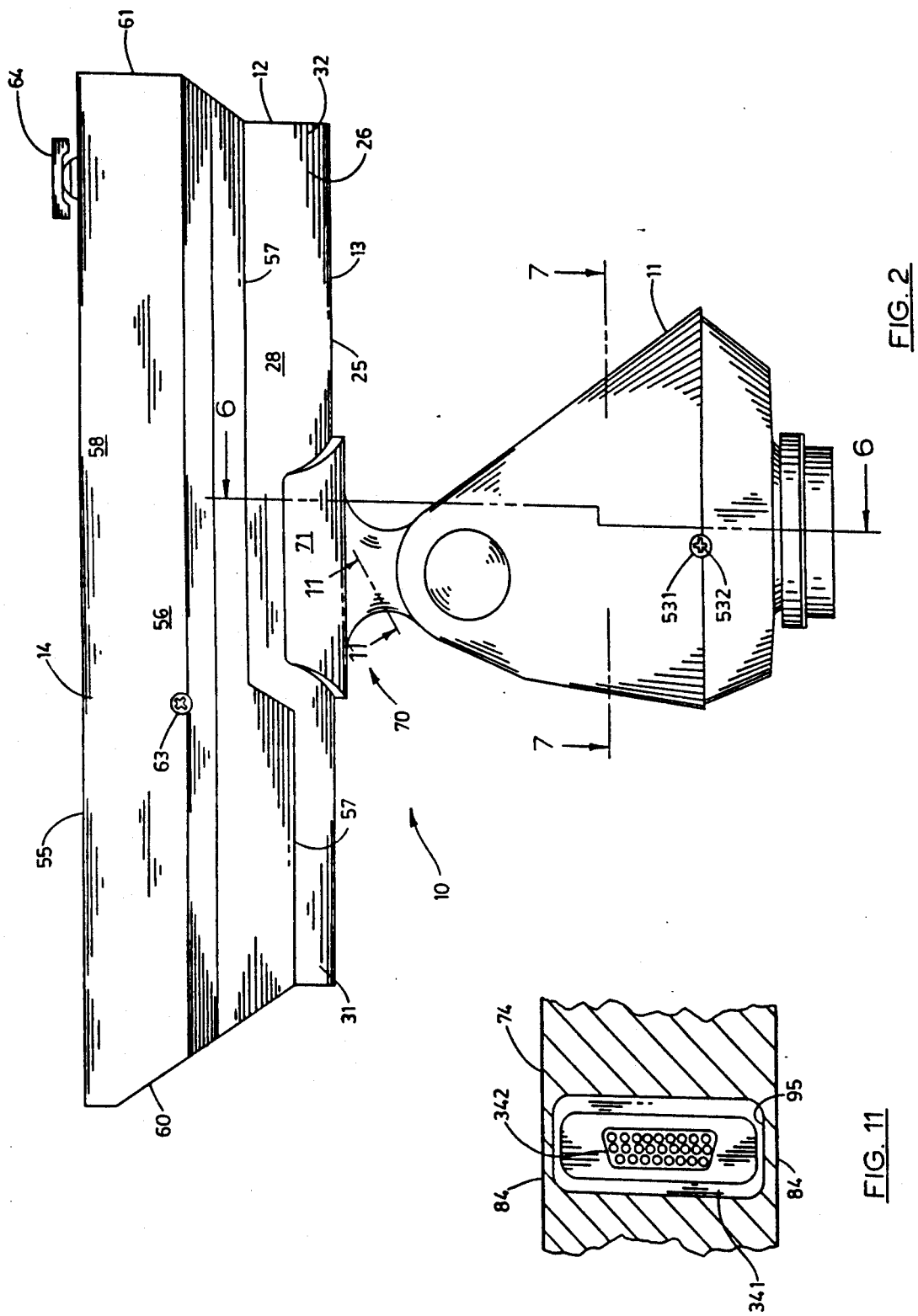

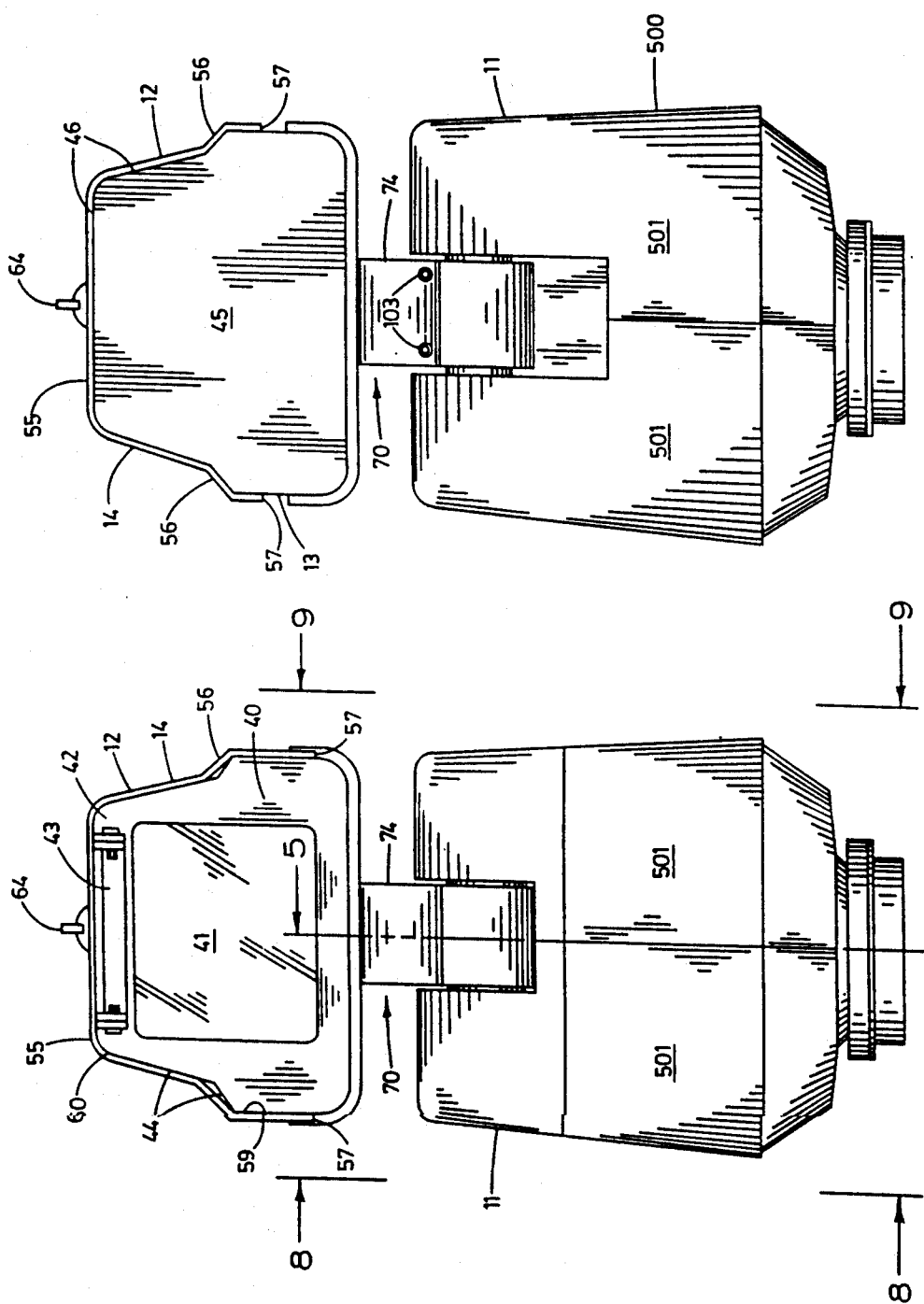

MOUNTING APPARATUS

BACKGROUND OF THE INVENTION

1. Field of the Invention

The present invention relates to a mounting apparatus and, more particularly, to such a mounting apparatus which has particular utility in mounting a camera, such as is used in a security or surveillance system, for controlled movement.

2. Description of the Prior Art

A variety of different environments require mounting and remotely controlling the operation of a work object. This is frequently complex due both to the functions to be performed by the mounting apparatus as well as to the specific location in which the mounting apparatus must be employed. For example, security or surveillance systems, require that a camera, such as a video camera, be mounted for controlled movement through a range of positions and in a location where accessibility is difficult. The problem of accessibility results both from the need to have the camera in a remote location having unobstructed visibility of the area to be monitored and from the desire to minimize tampering with or damage to the camera and related equipment by making access difficult. The problem of the complex range of movements required results from the need to move the camera along controlled courses so as to permit controlled observation of the entire area and in many such systems where the courses followed are not predictable as to order.

Conventional mounting devices for such cameras constituting operable parts of a complete security system have become technologically sophisticated in performing the various functions required to achieve the degree of surveillance desired. In the security industry, one of the most common general types of conventional mounting devices for such cameras is known as a "pan and tilt" system. Such systems mount the camera for movement about both horizontal and vertical axes. Movement about the vertical axis causes the camera to pan through the area being monitored from side to side as controlled by an operator, mechanical control system and or computer system. Movement of the camera about a horizontal axis accomplishes the "tilt" function of up and down movement capable of passing the view of the camera from a position near or immediately beneath the camera to a position farthest from the camera in the direction of the horizon. Such mounting devices have the capability of combining movement about the vertical and horizontal axes in such a fashion that the view of the camera can be passed in any direction over the area to be monitored.

Conventional mounting devices capable of performing such controlled movement of a security camera require a rather complex combination of subcomponents housed therewithin. Because of this factor and the movements which must be achieved by the camera, such conventional mounting devices are typically quite bulky and difficult to service. Since they are, for the reasons noted, typically mounted at remote and relatively inaccessible locations, such as the tops of buildings, poles, and other tall structures, installation, service, repair and replacement of such equipment including the camera, camera housing, and subcomponents of the control device is exceedingly difficult. These tasks are, therefore, not only quite expensive, but not as dependable as would otherwise be desirable. Furthermore, while such conventional mounting devices are expensive and are accordingly manufactured so as to provide the ultimum dependability, they inherently require repair, servicing and replacement. This is particularly true since they are typically exposed to the elements at remote locations high above external areas to be monitored. As a consequence, in many instances such servicing, repair and replacement requires that the entire assembly, including the camera housing, camera and control assembly, be removed from the place of installation and transported to a shop for such services. While the dependability of such services may be enhanced over that which would otherwise be the case, the expense and "downtime" necessitated thereby may be unacceptable.

Therefore, it has long been known that it would be desirable to have a mounting apparatus which is capable of mounting a work object, such as a security camera, for a full range of movement required in the performance of its operational objectives; which can be installed, serviced, repaired and components thereof replaced insitu and with a facility not heretofore achieved in the art; which is more compact than has heretofore been possible; which is fully sealed against the elements; and which is otherwise fully compatible with existing security systems and control devices while being fully effective in achieving its operational objectives.

SUMMARY OF THE INVENTION

Therefore it is an object of the present invention to provide an improved mounting apparatus.

Another object is to provide such a mounting apparatus which is particularly well suited to use in mounting a camera, such as a security camera employed in a surveillance system, for controlled movement in monitoring a predetermined area of observation.

Another object is to provide such a mounting apparatus which is fully compatible with conventional security systems, including control mechanisms of all types, as well as being adaptable to virtually any type of security system which might hereinafter be developed.

Another object is to provide such a mounting apparatus which, in its installed condition, is fully sealed against damage or malfunction by subjection to the elements when mounted in an exposed exterior location.

Another object is to provide such a mounting apparatus which facilitates the installation, servicing, repair and replacement of component parts at remote locations to a degree not heretofore achieved in the art.

Another object is to provide such a mounting apparatus which is so constructed as to mount the operative components thereof requiring service, adjustment, replacement or repair in positions affording an ease of access in performing such installation, adjustment, servicing, repair and replacement.

Another object is to provide such a mounting apparatus which readily permits the outer housings thereof to be removed and reinstalled with a minimum of effort while ensuring that these operations are performed with a precision not heretofore achieved in the art.

Another object is to provide such a mounting apparatus which readily permits precise and dependable adjustment of the operative components thereof with a facility and dependability permitting rapid performance of the task and to a degree not heretofore achieved in the art.

Another object is to provide such a mounting apparatus possessing a simplicity of construction while providing a full range of movement for the camera thereof so as to minimize the expense of manufacture, repair and replacement of the operative components thereof while being of strong and dependable construction.

Further objects and advantages are to provide improved elements and arrangements thereof in an apparatus for the purpose described which is dependable, economical, durable and fully effective in accomplishing its intended purpose.

These and other objects and advantages are achieved, in the preferred embodiment of the present invention.

BRIEF DESCRIPTION OF THE DRAWINGS

FIG. 2 is a somewhat enlarged side elevation of the mounting apparatus.

FIG. 3 is a front elevation of the mounting apparatus.

FIG. 4 is a rear elevation of the mounting apparatus.

FIG. 11 is a somewhat further enlarged fragmentary oblique section taken on line 11—11 in FIG. 2.

DESCRIPTION OF THE PREFERRED EMBODIMENT

Figure 1:
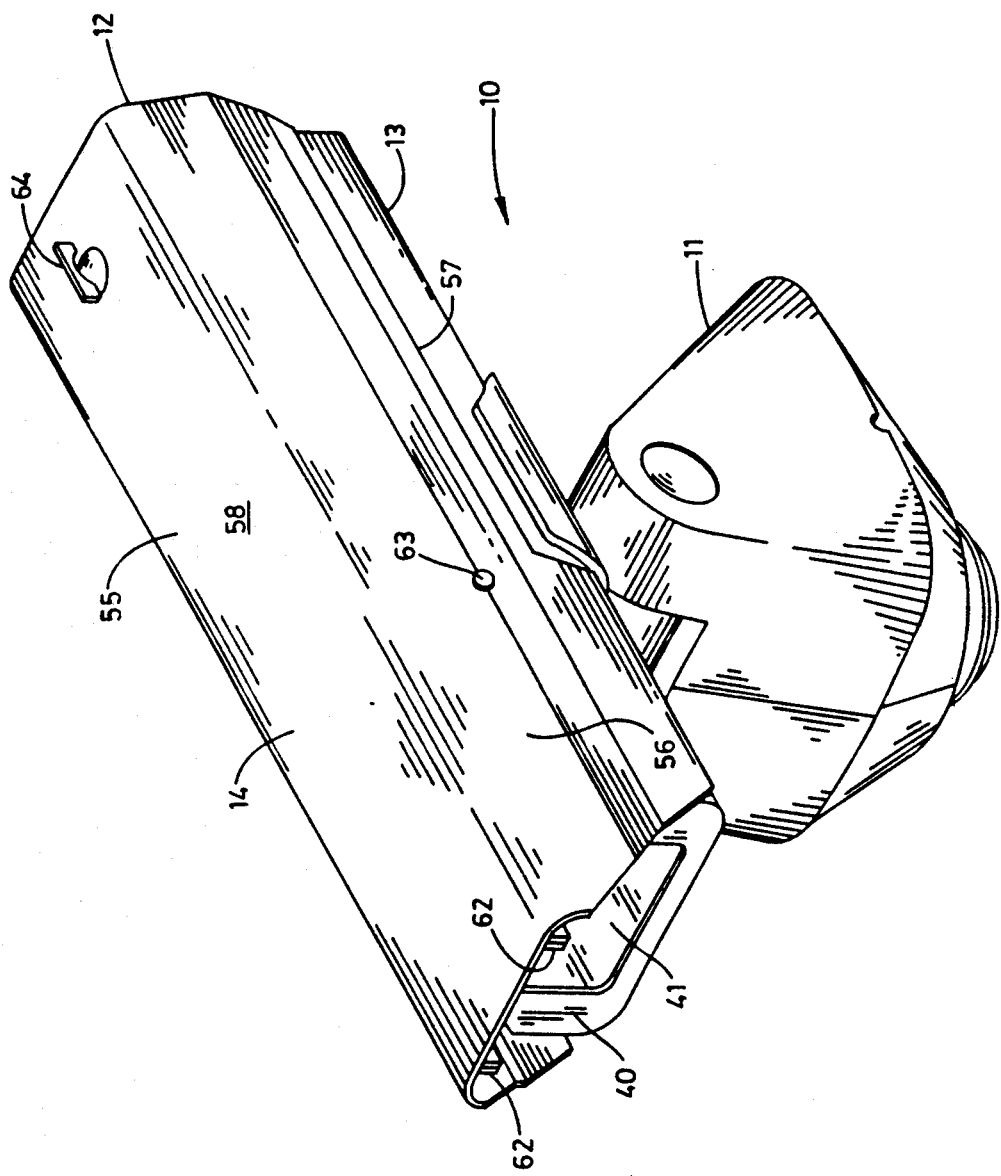
FIG. 1 is a perspective view of the mounting apparatus of the present invention.

Referring more particularly to the drawings, the mounting apparatus of the present invention is generally indicated by the numeral 10 in FIG. 1. While the mounting apparatus of the present invention has utility in a wide variety of working environments with a variety of types of work objects, it has particular well suited to the mounting and control of a camera, such as a surveillance camera as are employed in security systems to provide surveillance of a predetermined area from a remote location. Where employed in such security systems, such cameras, which are usually video cameras, are typically mounted in a variety of locations which are intentionally difficult to reach so as to minimize their susceptibility to tampering. In the preferred embodiment of the present invention, the specific mounting apparatus is capable of controlled movement of the video camera about both horizontal and vertical axes. Within the industry, conventional mounting devices having this capability are referred to as "pan and tilt" camera mounts in reference to this capability of movement around both horizontal and vertical axes.

The mounting apparatus 10 can generally be referred to as composed of a control assembly 11 on which is mounted a camera housing 12. The camera housing can be viewed as being composed generally of a lower housing 13 on which is mounted, as will hereinafter be described, a closure or upper housing 14.

Figure 6:
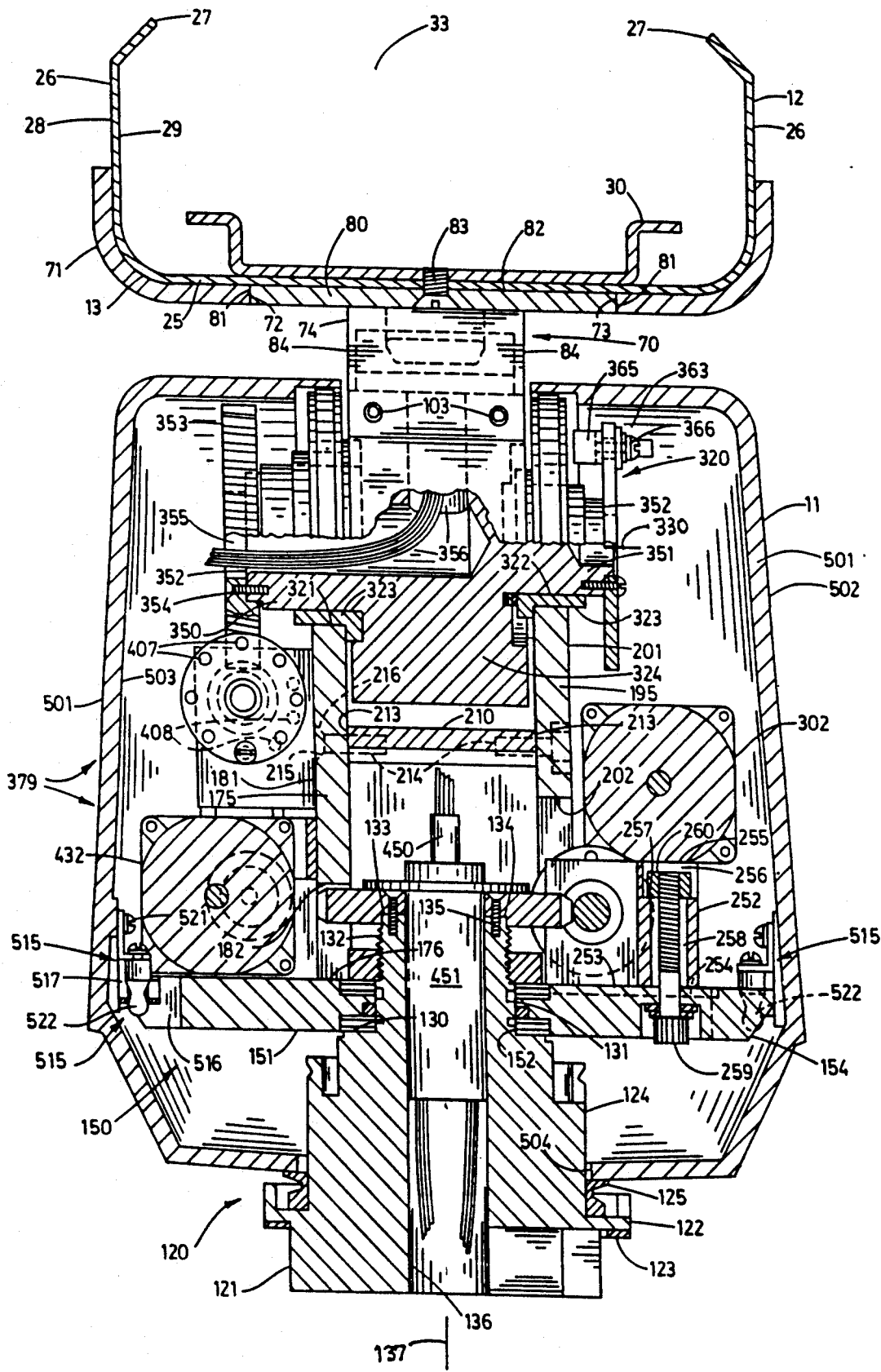
FIG. 6 is a somewhat enlarged fragmentary transverse, vertical section taken on line 6—6 in FIG. 2.

As may perhaps best be visualized in FIGS. 2, 3 and 4, the lower housing 13 of the camera housing 12 has a substantially flat bottom wall 25 from which extend substantially right angularly related side walls 26 having upper edges 27 which are bent inwardly in converging relation, as shown in FIG. 6. The lower housing has an outer surface 28 and an inner surface 29. A camera mount 30 is mounted on the inner surface 29 of the bottom wall 25 and may be of any suitable type. For illustrative convenience, no video camera is shown or described herein in relation to the mounting apparatus of the present invention. It will be understood that any suitable video or other camera can be employed as most suited to the needs of the specific operation to be performed. As shown in FIG. 2, the lower housing has a front portion 31 and opposite rear portion 32. The bottom wall and side walls of the lower housing define an interior 33 for the lower housing.

The lower housing 13 mounts a front wall 40 disposed in right angular relation to the bottom wall and extending upwardly therefrom interconnecting the side walls 26. The front wall has a transparent window 41 mounted therein permitting the camera housed within the camera housing 12 to have full visibility along a line of sight therethrough. The front wall extends to an upper portion 42 extending above the side walls 26 of the lower housing, as shown in FIG. 3. A hinge assembly 43 is mounted on the upper portion of the front wall externally of the lower housing and defining an axis of rotation substantially parallel to the front wall. The upper portion 42 of the front wall is bounded by lateral edges 44 shown in FIG. 3. The lower housing mounts a rear wall 45 extending upwardly from the bottom wall 25 at right angles thereto and interconnecting the side walls 26 substantially parallel to the front wall 40. The rear wall has lateral edges 46 substantially identical to the lateral edges 44 of the front wall.

The upper housing 14 has a substantially flat top wall 55 and downwardly divergent side walls 56, best shown in FIGS. 3 and 4. The side walls extend to lower edges 57. The top wall has an outer surface 58 and an inner surface 59. As best shown in FIG. 2, the upper housing has a front portion 60 and an opposite rear portion 61. Hinge mounts 62 are mounted on the inner surface 59 of the front portion and are pivotally mounted on the hinge assembly 43 to mount the upper housing for pivotal movement about the axis defined by the hinge assembly parallel to the plane defined by the front wall 40 of the lower housing 13. An air cylinder mount 63 is mounted on the side wall of the upper housing, as shown in FIGS. 1 and 2. An air cylinder, not shown, is mounted on the air cylinder mount within the upper housing. The air cylinder, not constituting part of the present invention, is employed in assisting movement of the upper housing from a closed position shown in the drawings to an opened position in pivotal movement about the axis defined by the hinge assembly so as to permit access to the camera, not shown, within the housing for repair, replacement, adjustment or service. Similarly, the upper housing mounts a latch assembly 64 on the top wall 55 employed in releasibly securing the upper housing in the closed position shown in the drawings.

The camera housing 12 has an attachment or cradle assembly 70 mounted therebeneath. The cradle assembly includes a cradle plate 71 fitted on the outer surface 28 of the bottom wall 25 of the lower housing in conforming relation. The cradle plate has a substantially rectangular base receptacle 72 centrally thereof defined by bounding edges 73. A base 74 includes a base plate 80 having lateral edges 81 and an upper surface 82. Screws 83 are extended through screw holes in the base plate and screw-threadably secured in suitable screw threaded holes in the bottom wall 25 and camera mount 30 of the lower housing 13. The base plate is retained in overlapping relation to the bounding edges 73 of the cradle plates 71 thereby securing both the cradle plate 71 and the base 74 on the bottom wall of the lower housing as shown in the drawings. The base has substantially parallel opposite side surfaces 84 visible in FIG. 6 and a flat lower surface 85, best shown in FIG. 5. A mounting slot 86 extends inwardly of the base from the lower surface at the oblique angle shown in FIG. 5 defined by substantially parallel opposite surfaces 87 and an interior surface 88 parallel to the lower surface 85. It will be understood that the mounting slot extends the full width of the base between the side surfaces 84 and thus through the side surfaces 84. Thus, the mounting slot 86 extends the full width of the base, as shown in FIG. 6.

Figure 5:
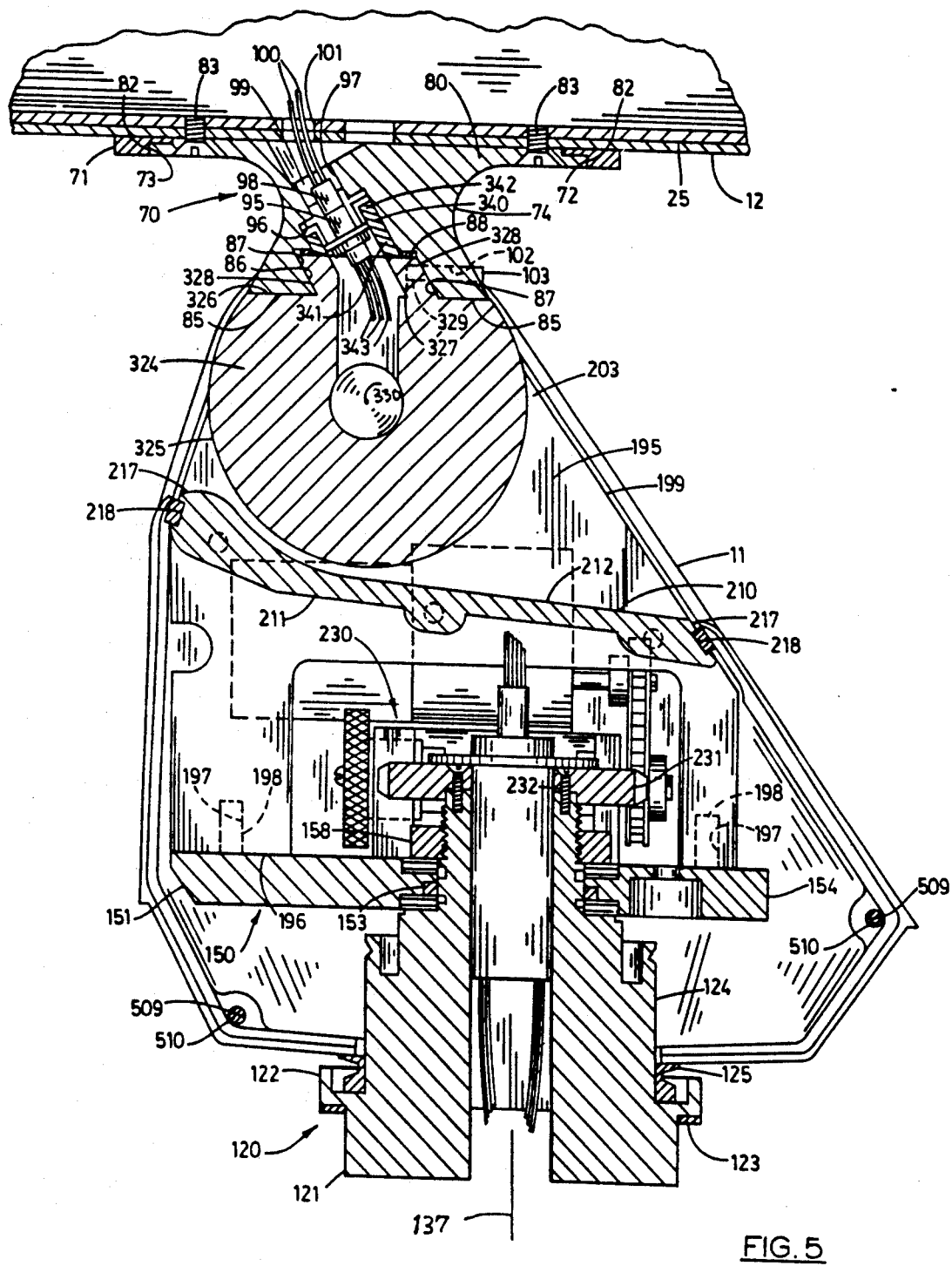
FIG. 5 is a somewhat enlarged fragmentary longitudinal, vertical section taken on line 5—5 in FIG. 3.

A plug receptacle 95 extends inwardly of the base from the mounting slot 86 at the same oblique angle as the mounting slot, as can best be seen in FIG. 5. The plug receptacle has an interior surface 96 through which a passage 97 extends through the base and out the upper surface 82 of the base plate 80. A male electrical connection 98 is mounted in the passage 97 by the mount 99. Several wire leads 100 extend from the plug and out of the base through the passage 97 through the upper surface 82 of the base plate. An opening 101 extends through the bottom wall 25 of the lower housing 13 and the camera mount 30 through which the wire leads are extended, as shown in FIG. 5. A pair of screw threaded passages 102 extend through the base along courses parallel to the lower surface 85 of the base and into communication with the mounting slot 86. A pair of fasteners or attachment bolts 103 are individually screw-threadably received in the screw threaded passages 102 for purposes subsequently to be described.

Turning then to the control assembly 11, the control assembly has a pedestal assembly 120 including a cylindrical base 121 circumscribed by an annular flange 122. A bearing ring 123 is affixed on the underside of the annular flange. The pedestal assembly has a cylindrical central portion 124 circumscribed by an annular seal 125 extending about the central portion and engaging the annular flange 122.

The pedestal assembly 120 has an annular edge 130 immediately beneath a cylindrical bearing surface 131. Immediately above the cylindrical bearing surface 131 is an externally screw threaded shaft 132 ending in a terminal portion 133 having a terminal surface 134 substantially right angularly related to a longitudinal axis defined by the pedestal assembly. A plurality of internally screw threaded holes 135 extend into the terminal surface 134. A first or central passage 136 concentric to the longitudinal axis of the pedestal assembly extends the full length of the pedestal assembly and out through the terminal surface 134 inwardly of the screw threaded holes 135. The longitudinal axis of the pedestal assembly to which the control passage is concentric is coincident with a first axis of rotation 137 of the mounting apparatus.

Figure 7:
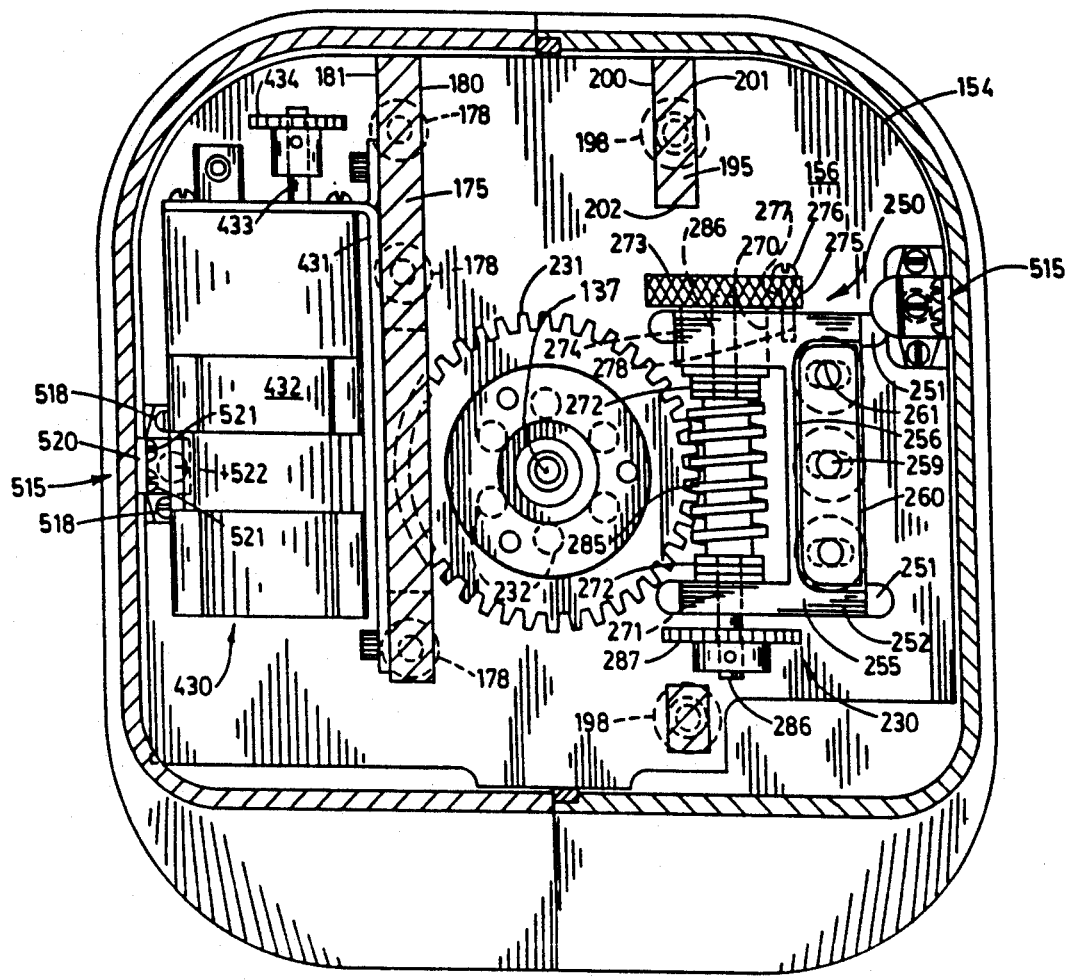
FIG. 7 is a somewhat enlarged horizontal section taken on line 7—7 in FIG. 2.

The control assembly 11 has a main frame 150, perhaps best shown in FIG. 6, serving as the main internal frame work for the control assembly. The main frame has a substantially horizontal base plate 151 the shape of which can perhaps best be seen in FIG. 7. The base plate has a cylindrical passage 152 substantially centrally thereof dimensioned slidably to be received about the cylindrical bearing surface 131 of the pedestal assembly 120, as best shown in FIG. 6. A thrust bearing assembly 153 is mounted in the base plate 151 extending about the cylindrical passage 152. As best shown in FIG. 7, the base plate 151 has lateral edges 154. The base plate has a lower surface 155 and an opposite upper surface 156. Two sets of bolt holes 157 extend through the base plate defining two parallel rows which can, perhaps, best be visualized in FIG. 7. A lock nut 158 is screw-threadably secured on the externally screw threaded shaft 132 of the pedestal assembly so as to capture the base plate 151 for rotational movement about the pedestal assembly.

As viewed in FIGS. 6 and 7, the main frame 150 has an upstanding left frame wall 175 having a lower surface 176 pierced by three screw threaded bolt holes 177. Three bolts 178 are individually extended through the bolt holes 157 in the base plate 151 and screw-threadably secured in the bolt holes 177 to mount the left frame wall securely on the upper surface 156 of the base plate. The left frame wall has a peripheral edge 179, shown in FIG. 9. The left frame wall has an inner surface 180 and an opposite outwardly facing or outer surface 181. A passage 182 extends through the left frame wall immediately above the base plate 151 to provide room for the operative components of the control assembly 11. The left frame wall has an upper portion 183.

The main frame 150 has an upstanding right frame wall 195, as viewed in FIGS. 6 and 7. The right frame wall 195 has a lower surface 196 pierced by screw threaded bolt holes 197. Two bolts 198 are individually extended through the bolt holes 157 of the base plate 151 and screw-threadably secured in the bolt holes 197 to mount the right frame wall 195 on the base plate in spaced substantially parallel relation to the left frame wall 175, as best shown in FIGS. 6 and 7. The right frame wall 195 has a peripheral edge 199, best shown in FIG. 8, an inner surface 200 in an opposite outwardly facing or outer surface 201. A passage 202 extends through the right upstanding frame wall 195 above the base plate to accommodate the working components of the control assembly hereinafter to be described. The right frame wall 195 has an upper portion 203.

As shown in FIG. 5, the main frame 150 has a transverse wall 210, having a lower surface 211, an upper surface 212 and lateral edges 213. Screw threaded bolt holes 214 extend inwardly of the transverse wall from the lateral edges 213. Bolt holes 215 extend through the frame walls 175 and 195 in a pattern corresponding to the screw threaded bolt holes 214 of the transverse wall. Bolts 216 are individually received in the bolt holes 215 and screw-threadably secured in the bolt holes 214 of the transverse wall to mount the transverse wall between the frame walls 175 and 195. The transverse wall has opposite edges 217 each having a groove 218, as shown in FIG. 5, for purposes subsequently to be described.

The control assembly 11 has a subsystem or pan drive assembly generally indicated by the numeral 230. A gear 231 is mounted on the terminal portion 133 of the pedestal assembly 120 and secured in position by a plurality of mounting screws 232 extending through suitable holes therein and individually screw-threadably secured in the screw threaded holes 135 of the terminal surface 134 of the pedestal assembly.

The pan drive assembly 230 has a worm gear assembly generally indicated by the numeral 250 in FIG. 7. The worm gear assembly includes a pair of parallel slots 251 formed in the upper surface 156 of the base plate 151. The worm gear assembly has a frame 252 having a flat lower surface 253 from which are extended a pair of guides 254 dimensioned and positioned individually slidably to be received in the slots 251. The frame has an upper surface 255 in which is formed a recess 256 above a substantially horizontal platform or shelf 257, as can best be visualized upon reference to FIG. 6. Three laterally elongated bolt holes 258 extend upwardly in parallel relation from the lower surface 253 to the upper surface 255 of the frame 252. Bolts 259 are individually received in the bolt holes 258 extending upwardly through the bolt holes and beyond the shelf 257 into the recess 256. A securing plate 260 having three screw-threaded bolt holes 261 therein is received within the recess with the bolts individually screw-threadably received in the securing plate, as best shown in FIG. 6.

As shown in FIG. 7, the worm gear assembly 250 includes a screw threaded bore 270 in the frame 252 and a smooth bore 271 in axial alignment with the screw threaded bore 270. Bearing assemblies 272 are individually secured in the screw threaded bore 270 and smooth bore 271. An adjustment member 273 having external screw threads 274 is screw-threadably received in the screw threaded bore 270. More specifically, the bearing assembly of the screw threaded bore is actually received in the adjustment member which is itself screw-threadably secured in the screw threaded bore 270. The adjustment member has a grasping wheel 275 adapted to be locked to the frame 252 by an attachment member or lock bolt 276 extendable through any one of a series of attachment points or holes 277 in the grasping wheel and screw-threadably secured in a selected one of the plurality of attachment points or screw threaded bores 278 in the frame 252 provided for the purpose. The holes 277 and bores 278 are arranged to define circles concentric to the axis of rotation of the worm gear assembly in the bearing assemblies. The spacing of the holes from each other and the spacing of the bores from each other is phased so that, for any given position of the grasping wheel, at least one of the holes and one of the bores will be aligned. As a consequence, the lock bolt can be extended therethrough to secure the grasping wheel in the frame and thus the worm gear assembly in the position selected to minimize unwanted clearance between frame 252 and bearing assemblies 272 without interference.

A worm gear 285 having oppositely extended and axially aligned shafts 286 is mounted for rotational movement in the bearing assemblies 272 of the frame 252. A sprocket 287 is mounted on the shaft 286 in the bearing assembly 272 of the smooth bore 271, as shown in FIG. 7.

Figure 8:
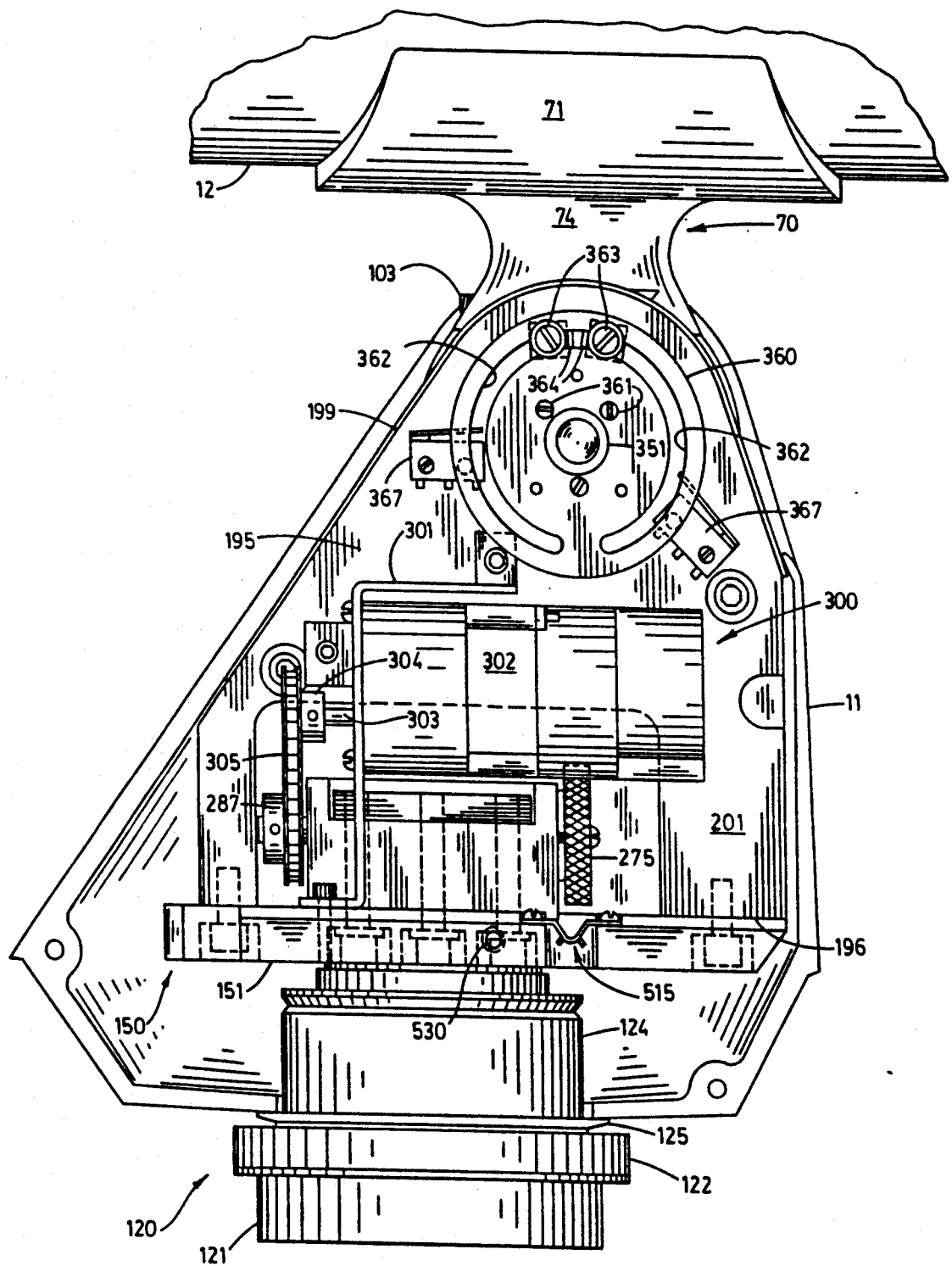
FIG. 8 is a somewhat enlarged fragmentary side elevation of the mounting apparatus taken from a position indicated by line 8—8 in FIG. 3 and showing the adjacent shell of the control assembly housing removed to expose the internal components of the control assembly.

A drive motor assembly 300, shown best in FIG. 8, is mounted on the right frame wall 195. The drive motor assembly includes a mounting plate 301 secured by any suitable means on the outer surface 201 of the frame wall 195. An electrical drive motor 302 is mounted on the mounting plate 301. The drive motor has a drive shaft 303 mounting a drive sprocket 304. A drive chain 305 is entrained in and extended about the drive sprocket 304 of the drive motor 302 and the sprocket 287 of the worm gear 285.

Referring more particularly to FIG. 6, the control assembly 11 has a base mounting assembly generally indicated by the numeral 320. The base mounting assembly includes a large passage 321 extending through the upper portion 183 of the left upstanding frame wall 175 and a small passage 322 extending through the upper portion 203 of the right frame wall 195. The large passage 321 and small passage 322 are axially aligned along an axis substantially parallel to the upper surface 156 of the base plate 151. Bearing assemblies 323 are individually mounted in the large passage and small passage, respectively. A pivot member 324 is mounted in the bearing assemblies 323 for pivotal movement, as will hereinafter be described. The pivot member has a lower cylindrical surface 325 and a flat upper surface 326. A base mounting projection 327 extends from the flat upper surface at an oblique angle corresponding to the oblique angle of the mounting slot 86 of the base 74 of the cradle assembly 70. The base mounting projection has parallel sides 328 and a pair of screw threaded bores 329 dimensioned and disposed screw-threadably to receive the attachment bolts 103 of the base. The pivot member is mounted for pivotal movement in the bearing assemblies about a second axis of rotation 330 of the mounting apparatus.

The base mounting projection 327 of the pivot member 324 mounts an electrical connection assembly generally indicated by the numeral 340 in FIG. 5. The electrical connection assembly includes a sleeve 341 mounted on and extending from the base mounting projection 327, as best shown in FIGS. 5 and 11. A female electrical plug 342 is mounted within the sleeve 341 for mating engagement with the male electrical connection 98 of the base 74. Wire leads 343 extend from the female electrical connection plug 342, as shown in FIG. 5.

Referring more particularly to the manner in which the pivot member 324 is mounted in the bearing assemblies 323, the pivot member mounts a large mounting shaft 350 and an oppositely extending small mounting shaft 351. The mounting shafts are axially related and have terminal ends 352. The large mounting shaft and the small mounting shaft are individually received respectively in the bearing assembly of the small passage 321 and the bearing assembly of the small passage 322, as can best be seen in FIG. 6. A gear 353 is mounted on the large mounting shaft 350 by screws 354 extending into holes provided therefor. The gear has a passage 355. A second passage or main electrical passage 356 extends from communication with the passage of the gear inwardly of the pivot member 324 and upwardly therein to communicate with the interior of the sleeve 341, as best shown in FIG. 5.

The small mounting shaft 351 of the pivot member 324 mounts a tilt control disk 360, best shown in FIG. 8. The tilt control disk 360 is mounted on the small mounting shaft 351 of the pivot member 324 by a plurality of screws 361. The tilt control disk has an arcuate slot 362 extending about the disk concentric to the small mounting shaft 351. A pair of trip assemblies 363 are mounted within the arcuate slot 362. Each of the trip assemblies has a grasping tab 364 extending to the right, as shown in FIG. 6, and a trip tab 365 extending toward the left, as viewed in FIG. 6. Each of the trip assemblies is releasably secured on the tilt control disk 360 by a fastening assembly 366. A pair of micro switches 367 are mounted on the right frame wall 195, as shown in FIG. 8, between the tilt control disk 360 and the frame wall 195.

Figure 10:
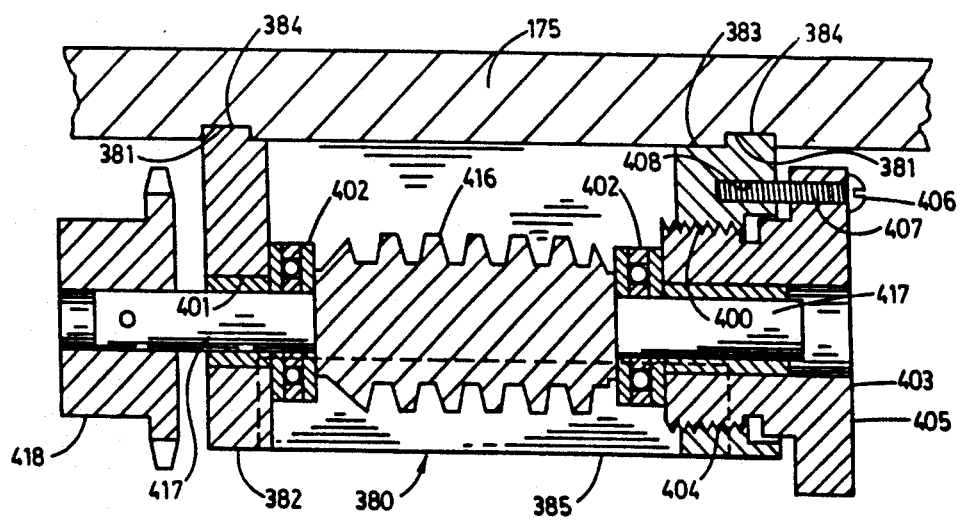
FIG. 10 is a somewhat further enlarged fragmentary horizontal section taken on line 10—10 in FIG. 9 showing the internal working elements of a worm gear assembly of the mounting apparatus of the present invention.
Figure 9:
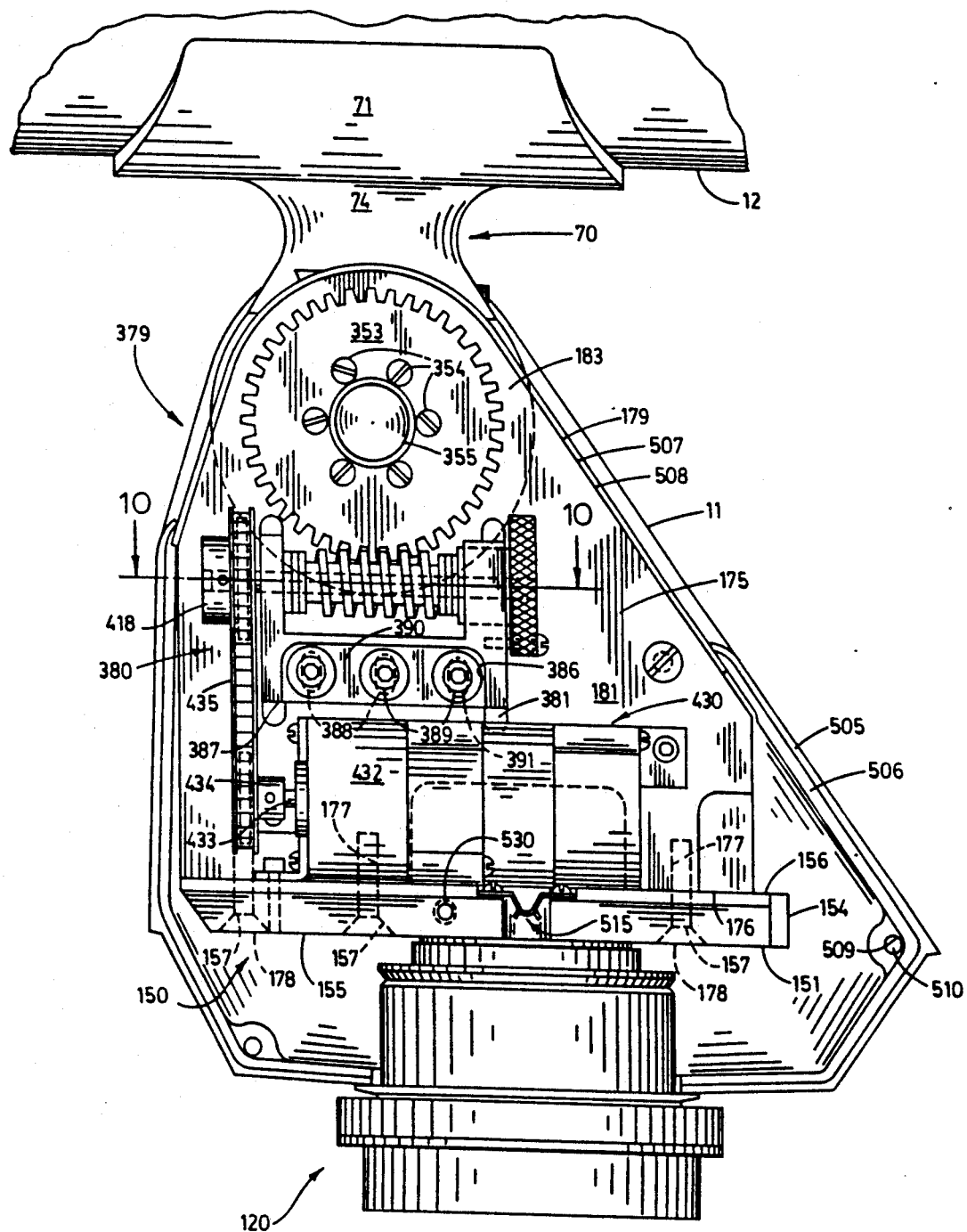
FIG. 9 is a somewhat enlarged fragmentary side elevation taken from a position indicated by line 9—9 in FIG. 3 with the adjacent shell of the control assembly housing removed to expose the internal components of the control assembly.

The control assembly 11 has a subsystem or tilt drive assembly generally indicated by the numeral 379 in FIG. 6. The tilt drive assembly has a worm gear assembly 380, best shown in FIGS. 9 and 10, which is mounted on the frame wall 175. The worm gear assembly includes a pair of substantially parallel slots 381 formed in the frame wall 175, as best shown in FIG. 9. The worm gear assembly has a frame 382 having a flat lower surface 383. The frame has a pair of guides 384 dimensioned and positioned slidably to be received individually in the slots 381, as shown in FIGS. 9 and 10. The frame has an upper surface 385 in which is formed a recess 386. The recess extends toward the upper surface 181 of the frame wall 175 to a platform or shelf 387 substantially parallel to the upper surface 181. Three laterally elongated bolt holes 388 extend from the lower surface 383 through the shelf 387 of the frame from the outer surface 181. Three bolts 389 individually extend through the laterally elongated bolt holes 388 and are screw-threadably secured in a securing plate 390 within the recess 386 individually within the screw threaded bolt holes 391 thereof.

The frame 382 has a screw threaded bore 400 and a smooth bore 401 axially aligned, as shown in FIG. 10. Bearing assemblies 402 are individually received within the screw threaded bore 400 and the smooth bore 401. More specifically, the bearing assembly of the smooth bore 401 is mounted therewithin while the bearing assembly for the screw threaded bore is mounted within an adjustment member 403 having screw threads 404 which are screw-threadably received in the screw threaded bore 400. Thus, the bearing assembly 402 on the right, as viewed in FIG. 10, is mounted within the adjustment member 403 which is, in turn, screw-threadably mounted in the screw threaded bore 400. The adjustment member has a grasping wheel 405. A lock bolt 406 extends through one of a plurality of holes 407 in the grasping wheel and can selectively be screw-threadably secured in any one of a plurality of screw threaded bores 408 spaced from each other and about the screw threaded bore 400. The holes 407 and 408 are arranged to define circles concentric to the axis of rotation of the worm gear assembly in the bearing assemblies. The spacing of the holes and the spacing of the bores from each other is phased so that, for any given position of the grasping wheel, at least one of the holes and one of the bores will be aligned. As a consequence, the lock bolt can be extended therethrough to secure the grasping wheel to the frame and thus the worm gear assembly in the position selected to minimize unwanted clearance between frame 252 and bearing assemblies 272 without interference.

A worm gear 416 having oppositely extending shafts 417 is mounted in the bearing assemblies 402 for rotational movement about the axis defined thereby. Thus, the shafts 417 are individually rotationally mounted in the bearing assemblies. A sprocket 418 is mounted on the shaft 417 on the left, as viewed in FIG. 10, for rotational movement with the worm gear and shafts.

A drive motor assembly 430 for the worm gear assembly 380 of the tilt drive assembly 379 is shown in FIG. 9. The drive motor assembly includes a mounting plate 431 mounted on the outer surface 181 of the left frame wall 175. An electrical drive motor 432 is mounted on the mounting plate and mounts a drive shaft 433 which is rotational upon operation of the drive motor. A drive sprocket 434 is mounted on the drive shaft 433 and is interconnected in driving relation to the sprocket 418 of the worm gear 416 by a drive chain 435 entrained about both sprockets.

A main electrical system or bundle 450, consisting of the electric wires or conductors for powering the various components of the control assembly 11 and the video camera, not shown, housed within the camera housing 12 is indicated by the numeral 450 in FIG. 6. The main electrical bundle is extended through a housing 451. The housing 451 is received in the central passage 136 of the pedestal assembly 120 and extends through the gear 231. The housing 451 is fixed relative to the pedestal assembly and gear 231 of the pan drive assembly 230, but the main electrical bundle 450 is rotational within the housing 451 with movement of the control assembly 11 and camera housing 12, as will hereinafter be described in greater detail.

It will be understood that the main electrical bundle 450 is operatively connected to all of the electrical components within the control assembly and camera housing in the conventional manner other than as herein described. The specific electrical circuitry, other than herein described, does not constitute part of the present invention. It will also be understood that the main electrical bundle and the various electrical wires thereof extend out through the cylindrical base 121 of the pedestal assembly 120 extending to the remote location, or locations, for operation of the control assembly, camera housing and video camera in accordance with the specific system employed. However, as may best be visualized upon reference to FIG. 6, the main electrical bundle 450 extends from between the upstanding frame walls 175 and 195 toward the left as viewed in FIG. 6, upwardly to the gear 353 of the tilt drive assembly 379, inwardly through the passage 355 in the gear 353, through the main electrical passage 356 and upwardly where it is operatively connected to the female electrical connection plug 342. Thus, as will hereinafter be discussed in greater detail, the main electrical bundle 450 is free to rotate with the control assembly 11 and camera housing 12 rotating in the pedestal assembly 120 within the housing 451.

The structure heretofore described of the control assembly 11 is enclosed within the assembled mounting apparatus 10 and is sealed from the environment. This is achieved by the control assembly housing 500 which is composed of a pair of closures or shells 501. Each of the shells has an outer surface 502 and an opposite inner surface 503. Each of the shells has an arcuate bottom opening 504 dimensioned to fit about the cylindrical central portion 124 of the pedestal assembly 120. The shells have lower abutting edges 505 along which the shells are adapted to engage each other to provide physical contact from the arcuate bottom opening upwardly therefrom to the points shown in FIG. 9.

A suitable seal 508 is provided along the abutting edges 505 so that the shells 501 in their assembled condition are sealed along the abutting edges from the bottom arcuate opening 504 upwardly along the abutting edges and then along the grooves 218 of the transverse wall 210, as can best be visualized in FIG. 5. Thus, the portion of the control assembly 11 confined between the transverse wall, the shells and the pedestal assembly 120 is sealed from the environment so as to protect the inner working parts of the control assembly. Similarly, as shown in FIG. 5, one of the shells contains a pair of alignment holes 509 and the other shell contains a pair of alignment pins 510. The alignment pins of one shell are positioned and dimensioned slidably to be received in the alignment holes 509 of the opposite shell in an installed position or assembled configuration so as to ensure precise fitting of the shells relative to each other.

In addition to the alignment holes 509 and alignment pins 510 adapted to mate therewith, the control assembly 11 has a pair of alignment assemblies 515, best shown in FIGS. 6, 7, 8 and 9. The alignment assemblies individually include recesses 516 formed in the base plate 151 from the lateral edges 154 thereof. Each alignment assembly includes a spring plate 517 mounted on the upper surface 156 of the base plate 151 and extending across the recess with an arcuate portion extending downwardly within the recess. Each spring plate has an opening 519 therein disposed in upwardly facing relation within the area defined by its respective recess. A bracket 520 is mounted on the interior surface 503 of each shell 501 in the position shown in FIG. 6. The bracket is mounted on the inner surface 503 by a pair of screws 521. An alignment pin 522 is mounted on the bracket so as to extend downwardly in an installed position. The opening 519 of its respective spring 517 and the alignment pin 522 are dimensioned in such a fashion that the alignment pin slidably interfits in the opening 519. Thus, the shell is permitted to be temporarily supported when the alignment pin is received in the opening. The spring plate 517 resiliently supports the weight of the shell in a ready position during installation and removal of the shell, as will hereinafter be described in greater detail.

A bolt hole 530 is provided in the lateral edge 154 of the base plate 151 in a predetermined position opposite each shell 501 in its installed position. These bolt holes can be seen in FIGS. 8 and 9 on their respective opposite sides of the base plate. Corresponding bolt holes 531 extend through each shell in alignment with their respective bolt holes 530 of the base plate. Bolts 532 are adapted individually to extend through their respective bolt holes 531 and be screw-threadably secured in the bolt holes 530 of the base plate so as to mount the shells 501 in their installed positions, as shown in FIGS. 2, 3, and 4.

OPERATION

The operation of the described embodiment of the present invention is believed to be readily apparent and is briefly summarized at this point. In the described embodiment of the mounting apparatus 10 of the present invention, for illustrative convenience, it will be understood that the mounting apparatus is employed as an operable part of a security system comprised of a central control station linked through electrical circuitry with a plurality of the mounting apparatuses and their respective camera housings disposed in a plurality of remote locations selected to provide observation of those areas to be provided with security. It will also be understood that the camera housing 12 contains a video camera, not shown, positioned so as to observe the area in which security is to be maintained through the transparent window 41. It will further be understood that the plurality of mounting apparatuses in their respective video cameras are positioned, as is typically the case, in areas which are difficult to reach so as to minimize the possibility of someone tampering with them. Thus, such locations typically include the tops of buildings, utility poles, towers and other available tall structures. Where no such structures are available, typically such devices are mounted on the tops of poles erected for the purpose.

As previously discussed, in conventional assemblies, the control assembly is operable to provide the "pan and tilt" capability so as to permit each such installation to scan the area to be protected by moving the video camera about both horizontal and vertical axes in accordance with the directions of a control system at the central control location.

Because of these and other considerations such as heretofore set forth, the installation, service, repair and replacement of such devices of conventional types is very difficult and, therefore, expensive. However, in the mounting apparatus of the present invention, ease of installation, service, repair and replacement is achieved to a degree not heretofore possible in the art.

However, the operation of the mounting apparatus 10 will first be described to give meaning to the benefits achieved in the mounting apparatus in such installation, servicing, repair and replacement. In this regard, it will be understood that the mounting apparatus is installed in the assembled configuration shown in the drawings and heretofore described. For illustrative convenience, it will be understood that the cylindrical base 121 is mounted in a mounting opening of a support arm, not shown, borne at a remote location such as, for example, the roof of a building adjacent to the area to be monitored. The bearing ring 123 engages the upper surface of the support arm and the mounting apparatus is mounted thereon by any suitable means conventional in the industry.

The main electrical bundle 450 extends to the mounting apparatus 10 through the support arm, not shown, from the central control. The main electrical bundle extends, as heretofore described upwardly through the housing 451 within the central passage 136 of the pedestal assembly 120 of the mounting apparatus. The main electrical bundle 450 extends between the frame walls 175 and 195, about the end of the frame wall 175 between the frame wall and the shell 501 upwardly adjacent to the inner surface 503 of the shell and into the passage 355 of the gear 353. The main electrical bundle passes along the main electrical passage 356 of the pivot member 324 and is wired on the female electrical connection plug 342, as shown in FIG. 5. Similarly, the male electrical connection 98 is matingly engaged with the female electrical connection plug 342 with the wire leads 100 extending through the passage 97 and opening 101 into the interior 33 of the lower housing 13 where they are wired in the conventional manner on the video camera, not shown, within the camera housing 12.

Movement of the camera housing, and thus, the video camera, not shown, therewithin is achieved by the control assembly 11 and more specifically by powering of the drive motor 302 of the drive motor assembly 300 and the drive motor 432 of the drive motor assembly 430. Electrical energy is supplied thereto through the main electrical bundle 450 using wire leads, not shown. Control over when and how long the drive motors are powered and in what directions their respective drive shafts 303 and 433 are rotated is controlled by the central control system which does not constitute part of the present invention. Thus, the sprockets 304 and 434 of the drive motors can be rotated in either clockwise or counterclockwise directions in accordance with the commands of the control system. In any case, such rotation of the drive sprockets transmits rotational movement to the sprockets 287 and 418 of the respective worm gear assemblies 250 and 380. Through such rotation, the respective worm gears 285 and 416 are rotated in their respective bearing assemblies 272 and 402. In the case of the worm gear assembly 250, the worm gear engaging the gear 231 causes the gear to be rotated in the selected direction, as can be visualized in FIG. 7. Since the gear is mounted on the pedestal assembly 120 which is stationary since it is mounted on an arm, not shown, it is the control assembly 11 that is rotated in response to such driving engagement about the pedestal assembly. Since the camera housing 12 is mounted on the control assembly 11, the camera housing is thereby rotated about the vertical axis of the pedestal assembly in either direction of rotation, at any desired speed and for any length of time desired. This is the operation of the pan drive assembly 230.

In the case of the tilt drive assembly 379, such movement is accomplished in a similar fashion. The drive motor 432 is powered at the command of the control center to rotate the worm gear 416 in the desired direction at the desired rate of speed and for the desired length of time thereby rotating the gear 353 engaged therewith. Since the gear 353 is mounted on the pivot member 324, the pivot member is caused to pivot in the desired direction about the horizontal axis thereof thereby tilting the camera housing 12 and the video camera therewithin about the horizontal axis.

As can, perhaps, best be seen in FIG. 6, the main electrical bundle 450 passes both along the vertical axis of rotation defined by the pedestal assembly 120 and the horizontal axis defined by the pivot member 324 thereby providing a full range of movement without, in any respect, straining or tangling the main electrical bundle.

Many of the advantages of the mounting apparatus of the present invention may best be understood upon reference to use thereof during installation, servicing, repair and replacement. As previously noted, such installations, conventional and in the case of the mounting apparatus of the present invention, are typically in locations presenting considerable difficulty as to accessibility. Accordingly, the convenience and dispatch with which these procedures can be performed considerably enhances the dependability with which they can be performed by personnel and substantially reduces the cost involved in performing these functions.

Beginning with the camera housing 12, installation is achieved by first mounting the video camera, not shown, within the camera housing 12. This can be accomplished either in a shop or on site. Generally, it is achieved by releasing the latch assembly 64 allowing the air cylinder, not shown, within the camera housing to open the upper housing 14 in movement about the hinge assembly 43 to expose the interior 33 of the lower housing 13. The video camera is installed in the camera housing in the conventional fashion. The camera housing is then brought to the place of installation and such installation is achieved simply by sliding the mounting slot 86 of the base 74 downwardly about the base mounting projection 327 and the electrical connection assembly 340 thereof until the male electrical connection 98 mates with the female electrical connection plug 342 to establish the electrical circuits therethrough.

Thereafter, the attachment bolts 103 are individually extended into and screw-threadably secured in the screw threaded bores 329 securely to mount the base of the camera housing on the pivot member of the control assembly and thereby simultaneously establishing all of the circuits from the central control through the control assembly and to the video camera within the camera housing. Removal of the camera housing for servicing, repair or replacement is achieved by a reversal of the steps heretofore set forth.

Installation, servicing, repair and replacement of components within the control assembly 11 is achieved by removal of either or both of the shells 501 of the control assembly housing 500. Such removal is easily accomplished by removing the bolt 532 of the shell to be removed. Only the single bolt is required to be removed for removal of the shell thereof from the main frame 150 of the control assembly 11. However, removal of the bolt does not free the shell to fall from the control assembly. Rather, the alignment assembly 515 of that respective shell resiliently retains the shell in supported position to permit the shell to be removed when the technician performing this duty has hands free for the task. Since the alignment pin 522 is received within the opening 519 of the spring plate 517, the shell is gravitionally retained with the pin in the opening and thereby cannot fall from the position described. However, once such removal is desired, the person performing the task need only grasp the outer surface 502 of the shell and lift upwardly to slide the alignment pin from the opening 519 freeing the alignment pins 510 from the alignment holes 509 and allowing removal of the shell.

As can best be visualized upon reference to FIG. 7, the various operable components of the control assembly 11 are mounted on the outer surfaces 181 and 201, respectively, of the frame walls 175 and 195. Thus, they are freely exposed and available for adjustment, removal and replacement, or general servicing. This is distinct from conventional control assemblies wherein such components are housed between frame walls which are disposed near the exterior of the control assembly making it extremely difficult or impossible to gain access to these components for these purposes without completely removing the control assembly and taking it back to the shop. FIG. 8 shows what is visible upon removal of the shell 501 from the right side of the control assembly as viewed in FIG. 7. FIG. 9 shows what is visible upon removal of the shell 501 from the left side of the control assembly, as viewed in FIG. 7. Thus, the pan drive assembly 230 is visible upon removal of the shell from the side shown in FIG. 8. Conversely, the tilt drive assembly 379 is visible upon removal of the shell from the side shown in FIG. 9. In each instance, all of the operative components thereof are fully accessible for the performance of such tasks.

The worm gear assemblies 250 and 380 can easily be adjusted as well as serviced, repaired or replaced insitu at the installed location of the control assembly 11. One such adjustment can best be visualized upon reference to FIG. 10. Since the worm gear assemblies are substantially identical in respect to such adjustment, they will be described in reference to the worm gear assembly 380, shown in FIG. 10. Longitudinal adjustment of the worm gear 416 is achieved by removing the lock bolt 406 from the screw threaded bore 408 of the frame 382 and hole 407 of the grasping wheel 405. Upon such removal, the grasping wheel is rotated in either a clockwise or counterclockwise direction as desired thereby moving the bearing assemblies 402 and worm gear 416 therebetween a short distance to the right or left, as viewed in FIG. 10. Once the precise adjustment is achieved, the lock bolt 406 is then extended through the appropriate aligned hole in the grasping wheel and screw threaded bore in the frame again to lock the grasping wheel and thereby the adjustment member 403 in the selected position. The precise adjustment of the worm gear relative to the gear 353 is thereby maintained and the clearance between the worm gear and bearing assemblies is minimized. This also allows reduction of the free uncontrolled movement between the camera housing 12 and the control assembly 11.

Adjustment of the worm gear assemblies 250 and 380 in directions transverse to the longitudinal axes of the worm gear assemblies may best be visualized by reference to FIGS. 6 and 7 with respect to the worm gear assembly 250. Since the frame 252 of the worm gear assembly 250 is mounted in position with the guides 254 thereof slidably received in the recesses 256 and retained in the precise adjusted position by the bolts 259, loosening of the bolts 259 frees the frame 252 for adjustment toward or from the gear 231 within the slots 251. The bolts are thus loosened from the securing plate 260 and the technician can then move the worm gear into the desired relationship in engagement with the gear 231. The worm gear assembly is then secured in the selected position by reversal of the steps heretofore described. Adjustment of the worm gear assembly 380 is accomplished in the same manner.

The tilt control disk 360 can be adjusted in a manner which can best be visualized upon reference to FIG. 8. Tilting movement of the camera housing 12 is controlled by engagement of the trip tabs 365 of the trip assemblies 363 with the micro switches 367. By loosening the fastening assemblies 366 and grasping the grasping tabs 364 of the trip assemblies the trip assemblies can be moved within the arcuate slot 362 to the positions desired. The fastening assemblies are then tightened to again lock the trip assemblies 363 in the selected positions.

Once all of the required installation, servicing, repair or replacement of the control assembly has been achieved, the shells 501 which had been removed are reinstalled. This is easily achieved by grasping the outer surface 502 of each shell in turn and inserting its respective alignment pin 522 in the opening 519 of the spring plate 517 thereof. As previously noted, this resiliently supports the shell in approximately its installed position while a technician's hands are free to more precisely adjust the shell or to reach for a tool, such as a screwdriver. The technician then simply screw threads the bolt 532 through the bolt hole 531 of the shell and tightens it into the bolt hole 530 of the base plate 151. The alignment pins 510 simply slide within the alignment holes 509. Once the bolts 532 of the respective shells are tightened into position to secure the seals thereof, the mounting apparatus is again available for operation.

Therefore, the mounting apparatus of the present invention provides an extremely reliable means by which, for example, a video camera can be supported and controlled through its various functions in monitoring a given area; which is extremely compact and lightweight; which is comparatively inexpensive to manufacture and install; and which can be serviced, repaired and have parts replaced insitu conveniently, dependably and inexpensively while achieving all of its operational objectives.

Although the invention has been herein shown and described in what is conceived to be the most practical and preferred embodiment, it is recognized that departures may be made therefrom within the scope of the invention which is not to be limited to the illustrative details disclosed.

Having described our invention, what we claim as new and desire to secure by Letters Patent is:

1. A mounting apparatus for a work object for panning and tilting the work object about respective panning and tilting axes relative to a stationary base, comprising:
   (A) a control assembly comprising:
   (1) a frame comprising a frame platform normal to the panning axis, and two centrally located interior frame walls essentially normal to said frame platform;
   (2) a panning mechanism for panning the work object relative to the stationary base, said panning mechanism being mounted to said frame platform in a manner to permit ready external access to the components of said panning mechanism;
   (3) a tilting mechanism for tilting the work object relative to the stationary base, said tilting mechanism being mounted to said frame walls in a manner to permit ready external access to the components of said tilting mechanism;
   (4) a pan drive mechanism mounted to either one of said frame walls and/or said frame platform exteriorly of said frame wall;
   (5) a tilt drive mechanism mounted to the other of said frame walls and/or said frame platform exteriorly of said frame wall;
   (6) an exterior housing comprising first and second environmentally sealed covers, each removably mounted to said frame platform and to the other of said covers, so that said first cover cooperates with said second cover to environmentally seal said panning mechanism and said pan drive mechanism from the elements, and said second cover cooperates with said first cover to environmentally seal said tilting mechanism and said tilt drive mechanism from the elements; and
   (B) an environmentally sealed housing for the work object mounted to said tilting mechanism for tilting relative to said control assembly.

2. The mounting apparatus of claim 1, wherein each of said exterior housing sealed covers includes a mounting pin for receipt into a respective mounting member on said frame platform, operable to retain said sealed cover in functional position about said frame platform.

3. The mounting apparatus of claim 1, wherein said mounting member is resilient in order to retain said mounting pin therein, thereby retaining said sealed cover in functional position about said frame platform.

4. The mounting apparatus of claim 1, wherein said panning mechanism is operable to move the work object relative to said panning axis, said panning mechanism includes a gear mounted for movement about said panning axis and a worm gear assembly mounted in driving engagement with said gear, and said pan drive mechanism is mounted in driving relation to said worm gear assembly, whereby operation of said pan drive mechanism rotates said worm gear assembly to move the work object about said panning axis.

5. The mounting apparatus of claim 4, wherein said worm gear assembly includes a worm gear frame mounted for substantially slidable movement on said frame platform toward and from said gear, said worm gear assembly having a shelf on which is received a securing plate and attachment means extending through said frame platform, said securing plate being operable releasably to capture said worm gear frame between said frame platform and said securing plate, thereby permitting said worm gear frame to be released for adjustment of said worm gear assembly toward or from said gear and to be resecured in a new selected position.

6. The mounting apparatus of claim 4, wherein said worm gear assembly includes a worm gear frame having a pair of axially aligned bores, one of which is screw threaded, defining an axis of rotation; adjustment member screw-threadably received in said screw threaded bore of said worm gear frame; and a worm gear mounted for rotational movement about said axis of rotation in said adjustment member and the other of said bores, whereby rotation of said adjustment member adjusts the position of said worm gear along said worm gear axis of rotation.

7. The mounting apparatus of claim 6, wherein said worm gear is mounted for rotational movement about said worm gear axis of rotation in said adjustment member and said other of said bores by bearing assemblies.

8. The mounting apparatus of claim 6, wherein said worm gear frame includes a plurality of attachment points spaced from each other to define a circle essentially concentric with said screw threaded bore, said adjustment member having a plurality of attachment points spaced from each other to define a circle essentially concentric with said worm gear axis of rotation, and an attachment member is operable to interconnect an attachment point of said worm gear frame and an attachment point of said adjustment member releasably to lock said adjustment member in position relative to said worm gear frame, thereby locking said worm gear in a selected position of adjustment.

9. The mounting apparatus of claim 8, wherein the positions of the attachment points of said worm gear frame and the positions of the attachment points of said adjustment member are so phased relative to each other that substantially for any given position of said adjustment member, at least one of the attachment points of said worm gear frame and one of the attachment points of said adjustment member are aligned for interconnection by said attachment member.

10. The mounting apparatus of claim 1, wherein said tilting mechanism is operable to move the work object relative to said tilting axis, said tilting mechanism includes a gear mounted for movement about said tilting axis and a worm gear assembly mounted in driving engagement with said gear, and said tilt drive mechanism is mounted in driving relation to said worm gear assembly, whereby operation of said tilt drive mechanism rotates said worm gear assembly to move the work object about said tilting axis.

11. The mounting apparatus of claim 10, wherein said worm gear assembly includes a worm gear frame mounted for substantially slidable movement on one of said frame walls toward and from said gear, said worm gear assembly having a shelf on which is received a securing plate and attachment means extending through said frame wall, said securing plate being operable releasably to capture said worm gear frame between said frame wall and said securing plate, thereby permitting said worm gear frame to be released for adjustment of said worm gear assembly toward or from said gear and to be resecured in a new selected position.

12. The mounting apparatus of claim 10, wherein said worm gear assembly includes a worm gear frame having a pair of axially aligned bores, one of which is screw threaded, defining an axis of rotation; adjustment member screw-threadably received in said screw threaded bore of said worm gear frame; and a worm gear mounted for rotational movement about said axis of rotation in said adjustment member and the other of said bores, whereby rotation of said adjustment member adjusts the position of said worm gear along said worm gear axis of rotation.

13. The mounting apparatus of claim 12, wherein said worm gear is mounted for rotational movement about said worm gear axis of rotation in said adjustment member and said other of said bores by bearing assemblies.

14. The mounting apparatus of claim 12, wherein said worm gear frame includes a plurality of attachment points spaced from each other to define a circle essentially concentric with said screw threaded bore, said adjustment member having a plurality of attachment points spaced from each other to define a circle essentially concentric with said worm gear axis of rotation, and an attachment member is operable to interconnect an attachment point of said worm gear frame and an attachment point of said adjustment member releasably to lock said adjustment member in position relative to said worm gear frame, thereby locking said worm gear in a selected position of adjustment.

15. The mounting apparatus of claim 14, wherein the positions of the attachment points of said worm gear frame and the positions of the attachment points of said adjustment member are so phased relative to each other that substantially for any given position of said adjustment member, at least one of the attachment points of said worm gear frame and one of the attachment points of said adjustment member are aligned for interconnection by said attachment member.

* * * * *